US007328008B2

(12) United States Patent
Bjorken

(10) Patent No.: US 7,328,008 B2
(45) Date of Patent: Feb. 5, 2008

(54) MEANS AND METHOD FOR MEASURING THE STATUS OF A CORE INTERFACE BETWEEN TWO CORE SUBNETWORKS IN A TELECOMMUNICATION SYSTEM

(75) Inventor: Peter Bjorken, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/545,279

(22) PCT Filed: Jan. 9, 2004

(86) PCT No.: PCT/SE2004/000008

§ 371 (c)(1),
(2), (4) Date: Aug. 11, 2005

(87) PCT Pub. No.: WO2004/077854

PCT Pub. Date: Sep. 10, 2004

(65) Prior Publication Data

US 2006/0084423 A1 Apr. 20, 2006

(30) Foreign Application Priority Data

Feb. 28, 2003 (SE) .................................... 0300537

(51) Int. Cl.
*H04Q 7/20* (2006.01)

(52) U.S. Cl. .................... 455/423; 455/456.1; 370/252

(58) Field of Classification Search ................ 455/433, 455/426.1
See application file for complete search history.

(56) References Cited

U.S. PATENT DOCUMENTS 6,505,044 B1 * 1/2003 Back et al. ................. 455/445
2002/0137532 A1 9/2002 Landais et al.
2003/0185190 A1 * 10/2003 Chitrapu et al. ............ 370/338
2004/0082353 A1 * 4/2004 Kekki ........................ 455/522

OTHER PUBLICATIONS

ETSI TS 101 346 V7.5.0: Digital Cellular Telecommunications System (Phase 2+), General Packet Radio Service (GPRS); Serving GPRS Support node (SGSN)—Visitors Location Register (VLR); Gs interface layer 3 specification (3GPP TS 09.18 version 7.5.0 Release 1998), Dec. 2001.

Swedish Patent Office, International Search Report for PCT/SE2004/000008, dated Mar. 25, 2004.

* cited by examiner

*Primary Examiner*—Lester G. Kincaid
*Assistant Examiner*—Fred Casca
(74) *Attorney, Agent, or Firm*—Roger S. Burleigh

(57) ABSTRACT

The invention relates to a signaling method for GSM/GPRS communication systems. The status of a core interface between two core subnetworks is measured in the core network (S2), preferably through a keep-alive mechanism (S1). A status indication message is then sent to the radio network (S3). In this way, the BSS becomes aware of possible interface problems and failures, and can take appropriate actions, such as changing the network operating settings related to the NOM and/or allocated channel types (S4). The invention enables secure operation of NOM-I systems with P-channels irrespective of the Gs interface status.

23 Claims, 6 Drawing Sheets

BSS
110-1
122-1
110-2
110-3
122-2
BSC
124
MSC
212
GMSC
214
VLR
EIR
AUC
HLR
213 215 217 219
PSTN
300-1
ISDN
300-2
OTHER PLMN
300-3

MEANS AND METHOD FOR MEASURING THE STATUS OF A CORE INTERFACE BETWEEN TWO CORE SUBNETWORKS IN A TELECOMMUNICATION SYSTEM

TECHNICAL FIELD

The present invention relates to a signaling method for telecommunication systems and in particular for Global System for Mobile communication/General Packet Radio Service (GSM/GPRS) networks.

BACKGROUND

GPRS is a standard on packet data in GSM systems developed to meet the increased demand for wireless data services. It enables efficient transfer of user data packets between mobile terminals and external packet data networks, such as the Internet. GPRS results in a number of advantages, in particular with regard to resource utilization, billing, transfer rates and access times.

In order to integrate GPRS into an existing GSM network, two new types of core network nodes have to be introduced. These are the Serving GPRS Support Node (SGSN) and the Gateway GPRS Support Node (GGSN). GGSN acts as an interface towards external packet data networks, while SGSN is responsible for packet delivery to and from terminals within a certain area.

The capabilities of GPRS networks are defined through Network Operating Modes (NOM). In NOM-I networks, an interface is configured between the Mobile Switching Center (MSC) and SGSN, enabling the nodes to interact. This so-called Gs interface is a prerequisite for NOM-I. Neither NOM-II, which is the default mode today, nor NOM-III has the optional Gs-interface configuration. By means of the Gs interface, enhanced efficiency and co-ordination of GPRS and non-GPRS services can be achieved.

In NOM-I, GPRS capable terminals perform combined procedures, such as combined GPRS and International Mobile Subscriber Identity (IMSI) attach and combined location area/routing area (LA/RA) update, towards the SGSN. A configured Gs interface is actually not in active use until the terminals have received a NOM-I indication and begin performing these combined procedures. Circuit Switched (CS) paging for terminals that are both GPRS and IMSI attached is then sent over the Gs interface because of the advantages obtained thereby.

A poor or non-working Gs interface leads to serious signaling and transfer problems. If the Gs interface is not fully reliable, pages that are normally routed over this interface are likely to get lost. CS pages sent via the Gs interface to terminals both GPRS and IMSI attached will for instance not reach the terminals if this interface is down. This considerably reduces the value of the service in the eyes of an end user.

A further problem associated with Gs interface failure is that combined procedures cannot be performed. The terminals will repeatedly try to complete the procedures, inhibiting CS calls for a relatively long period of time. The effect gets particularly serious when the end user repeatedly turns the phone on and off in belief that the phone has crashed, since the try period starts over every time the terminal is turned on.

Accordingly, the Gs interface handling of conventional telecommunication systems is far from satisfactory and there is a considerable need for an improved signaling method.

SUMMARY

A general object of the present invention is to provide an improved signaling method for telecommunication systems. A specific object is to provide reliable paging to terminals that are both packet-switched and circuit-switched attached. Another object is to enable guaranteed speech service in GPRS NOM-I.

These objects are achieved in accordance with the attached claims.

Briefly, the present invention achieves improved speech service in telecommunication systems by status synchronization between the core network and the radio network. The status of a core interface between two core subnetworks is measured, preferably through a keep-alive mechanism. An indirect or explicit status indication is then sent from the core network to the radio network. In this way, the Base Station Subsystem (BSS) of the radio network becomes aware of possible interface problems and failures, and can take appropriate actions in response to the reported interface condition. Such actions may comprise changing the network operating settings, e.g. related to the NOM and/or allocated channel types, in order to enable signaling over other signal paths.

The invention may with advantage be used for monitoring and signaling the status of a Gs interface in a GSM/GPRS communication network, where it considerably facilitates use of NOM-I and P-channels. By means of the invention reliable transfer of CS pages for terminals both GPRS and IMSI attached in systems operated in NOM-I with P-channels is achieved irrespective of the Gs interface condition.

According to another aspect of the invention there is provided signaling means for a telecommunication system with a core interface connection.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings the same reference numbers are used for similar or corresponding elements.

Figure 1:
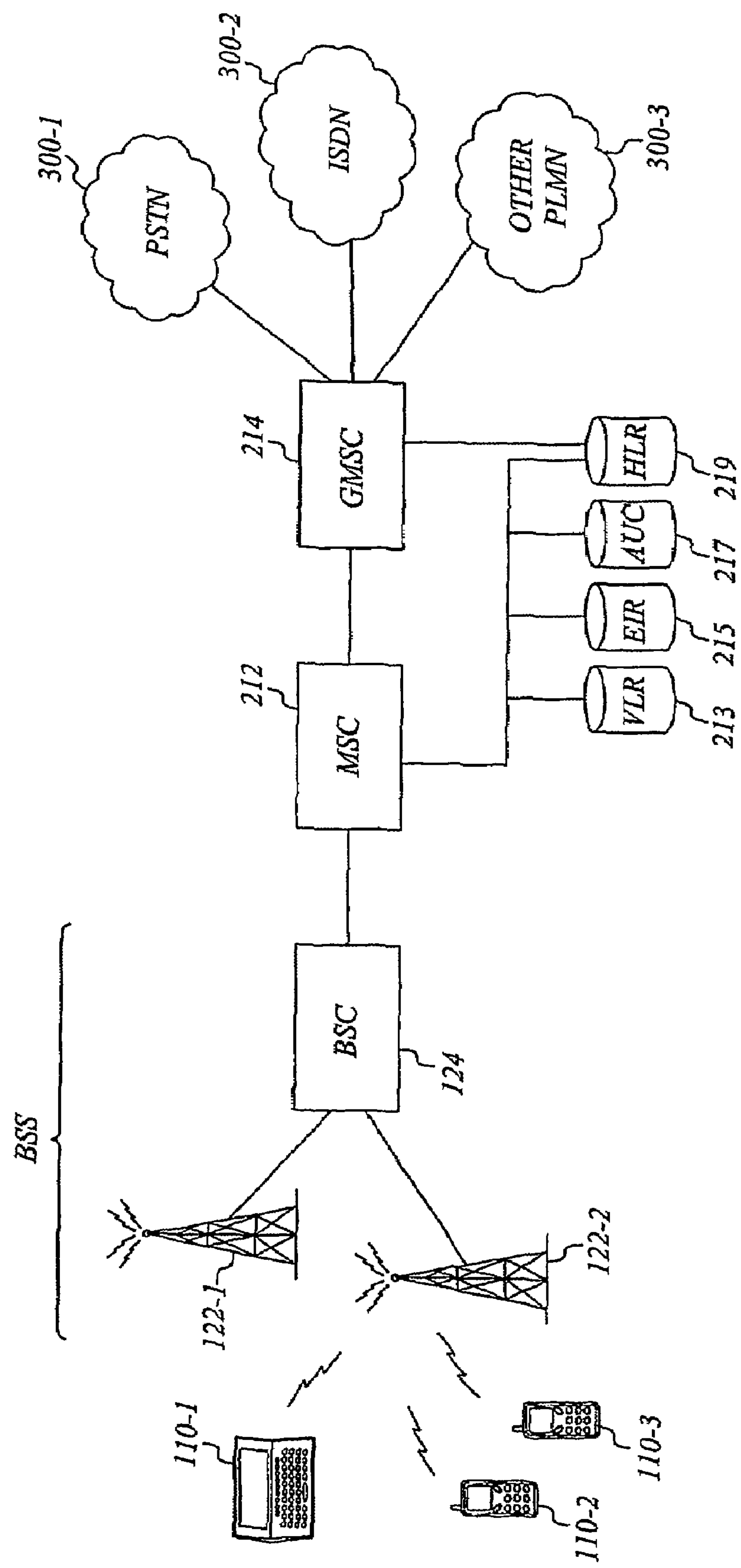
FIG. 1 is a schematic overview of an examplary conventional network for GSM communication.

FIG. 1 is a schematic overview of an examplary conventional Public Land Mobile Network (PLMN) for GSM communication. A radio network comprising a number of mobile stations/terminals 110, such as mobile phones and laptops, and a BSS communicating over the radio air interface is shown. Each mobile terminal is assigned a unique IMSI. The BSS performs all radio-related functions of the network and typically contains a large number of Base Transceiver Stations (BTS) 122 and Base Station Controllers (BSC) 124. Each BTS serves the mobile terminals within its respective coverage area and several BTS are controlled by a BSC, which in turn provides access to a core network comprising a MSC 212 and a Gateway Mobile Switching Center (GMSC) 214. The operation of the radio network is generally completely independent of what is happening in the core network.

The GSM traffic is routed through the MSC 212. The MSC may retrieve information from databases for call control and network management, such as a Visitor Location Register (VLR) 213, Equipment Identity Register (EIR) 215, Authentication Center (AUC) 217 and Home Location Register (HLR) 219. The VLR 213 is responsible for the current location of a mobile terminal 110 and therefore temporarily stores information, including the IMSI, of visitors in the coverage area of a particular MSC 212. Communication to and from external networks 300, including fixed networks such as Public Switched Telephone Networks (PSTN) and Integrated Services Digital Networks (ISDN) as well as other PLMN, are handled by the GMSC 214.

Figure 2:
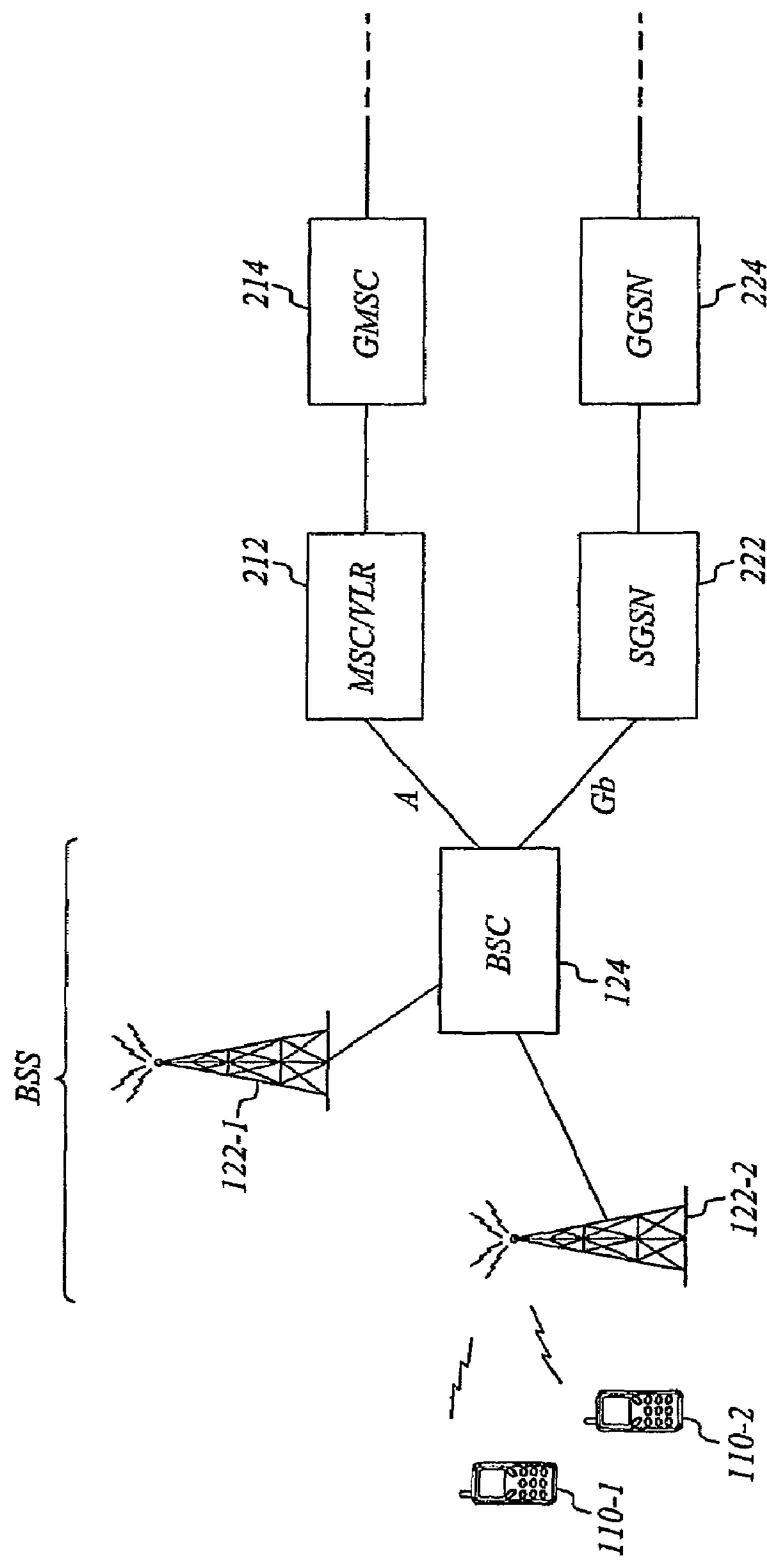
FIG. 2 is a schematic overview of an examplary GSM/GPRS communication network.

FIG. 2 is a schematic overview of an examplary GSM/GPRS communication network. The main difference compared to the network in FIG. 1 is that GPRS introduces SGSN 222 and GGSN 224 nodes, which form the basis of a packet-switched subnetwork in the overall telecommunication system. The GGSN 224 interconnects the GPRS backbone network with external packet data networks (not shown), such as the Internet, other GPRS PLMN or enterprise Intranets. The main task of the SGSN 222, on the other hand, is to deliver packets to and from the GPRS mobile terminals within its service area.

The role of the SGSN 222 for packet data service to a large extent corresponds to that of the MSC for circuit-switched service, which in the example of FIG. 2 is implemented together with the VLR and therefore denoted MSC/VLR 212. The SGSN is arranged on the same general network level as the MSC/VLR in the sense that both communicate with the BSS of the radio network. As indicated in FIG. 2, the SGSN provides packet routing to and from the radio network over an interface denoted Gb, whereas the MSC/VLR communicates with the BSS over an interface A. The BSS handles all communication with the mobile terminals.

In practice, most GSM networks comprise multiple network elements and nodes arranged in much more complex ways than in the basic examples of FIGS. 1 and 2.

Figure 3:
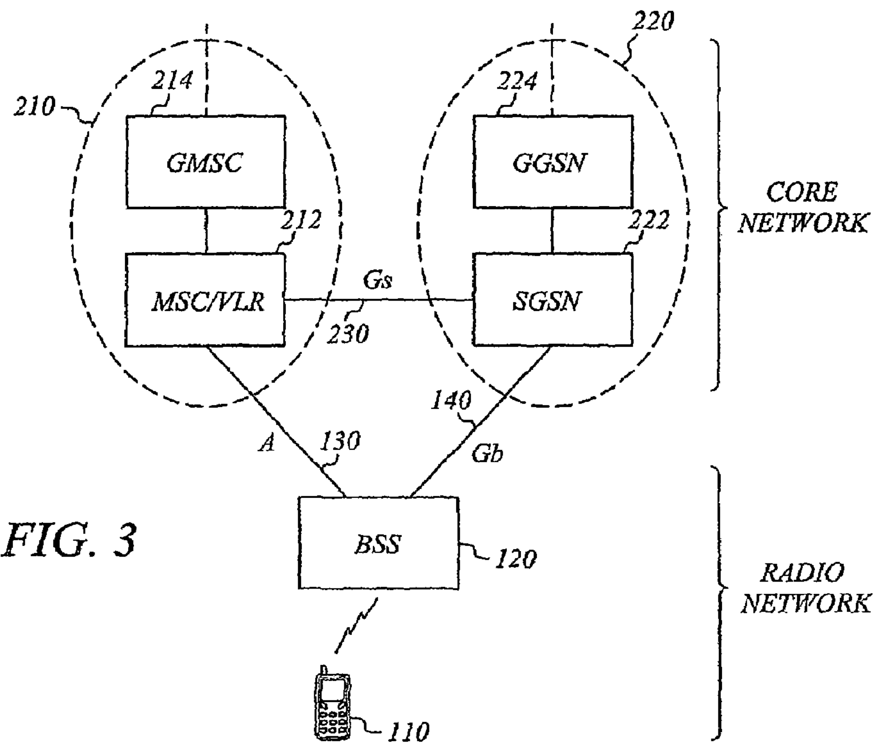
FIG. 3 is a schematic block diagram illustrating a GSM/GPRS network with a Gs interface, in which network the present invention may be used.

FIG. 3 is a schematic block diagram illustrating a GSM/GPRS network for which the present invention may be used. A core network comprising two core subnetworks 210, 220 is disclosed. The core subnetworks are reached through separate access points and may serve different types of traffic or provide different service functionality. The first core subnetwork 210 of the illustrated example provides circuit-switched service and includes the MSC/VLR 212 connected to the GMSC 214. The second core subnetwork 220 is packet-switched and includes the GPRS nodes SGSN 222 and GGSN 224. As before, respective interfaces A 130 and Gb 140 are provided between the respective core subnetworks and the radio network. The radio network comprises the BSS 120 and the mobile terminals 110 and all information to the mobile terminals has to go through the BSS. In this case there is also an interface Gs 230, enabling communication between the core subnetworks 210, 220 or more specifically between the MSC/VLR 212 and the SGSN 222.

As mentioned in the background section, the Gs interface is associated with the GPRS Network Operating Mode I (NOM-I). In NOM-I, terminals that can be both GPRS and IMSI attached perform combined procedures towards the SGSN. This includes combined GPRS/IMSI attach and combined LA/RA update. The SGSN in turn sends updates to the MSC over the Gs interface when required.

Further in NOM-I, CS pages for terminals that are both GPRS and IMSI attached are sent over the Gs interface via the SGSN to the BSS, instead of the ordinary CS route directly from the MSC to the terminal, which still has to be used for non-GPRS terminals. The SGSN pages the terminal on RA or cell level depending on if the terminals are in READY or STANDBY state. The BSS transmits the pages to the terminals on common control channels or on packet transfer associated channels depending on if the terminals are in packet idle mode or packet transfer mode.

Sending CS pages for certain phones in the described roundabout way, via the SGSN to the BSS, brings a number of advantages. One is that the mobile terminal may be reached even during an ongoing data transfer. Moreover, the signaling load is reduced due to the combined procedures. Another advantage is that the paging coordination enables use of the so-called P-channels, aspects of which will now be described more in detail.

GPRS defines a set of logical channels optimized for packet data, commonly referred to as P-channels. The P-channels are optional and if not assigned the ordinary control channels are used for GPRS broadcast and signaling. The P-channel set comprises the Packet Broadcast Control Channel (PBCCH) and Packet Common Control Channel (PCCCH), which correspond to the ordinary control channels BCCH and CCCH.

The PBCCH is used to broadcast Packet System Information (PSI), including cell specific GPRS information needed for accessing the cell. On the uplink, the PCCCH is used to transmit channel requests for packet switched services from the terminals, whereas the downlink is used to transmit pages and assignments for such services. In NOM-I, i.e. when there is a Gs interface, the PCCCH downlink can also be used to transmit pages for CS services. Pages transferred over the A interface, on the other hand, must always be sent on the CCCH.

Although the Gs interface can be configured in the core network at any time, it cannot be employed until NOM-I has been communicated to the terminals. The NOM is typically set by operator commands in the BSS of the radio network and communicated to the GPRS terminals in PSI on the PBCCH. When the terminals have received the NOM-I indication and started with the combined procedures, the Gs interface is used for CS paging to terminals that are both GPRS and IMSI attached.

As explained in the background section, a non-reliable Gs interface leads to severe shortcomings in the network service reliability. CS pages to GPRS terminals are likely to get lost in case of Gs interface failure. In other words, a Gs interface breakdown implies lost speech calls. Moreover, combined procedures are not possible when the Gs interface is down. This inhibits CS calls for considerable periods of time.

A prior-art solution that may be applied if some part of the chain from the MSC via the SGSN and to the radio network is not working properly is to configure the MSC to send second CS page attempts directly to the radio network over the A interface. In other words, a failed first attempt of sending a page over the Gs interface makes the MSC switch to the ordinary CS route. This might work in some cases but when P-channels are allocated the GPRS capable terminals do not listen to the ordinary control channels and the problem of lost CS pages remains.

Today, the NOM setting in the BSS is thus separate from the configuration and existence of the Gs interface in the core network. In fact, the core network and the radio network are completely separated in the sense that they are associated with separate areas of responsibility and no status-related information is sent between them. The present invention is based on the recognition that the described drawbacks can be overcome by, as opposed to all conventional techniques, enabling status synchronization between the core network and the radio network. The invention accordingly supports such status synchronization and in particular a way of connecting the core network and the radio network when it comes to the status of a core interface like the Gs interface is proposed.

Basically, the status of the core interface is monitored in the core network, whereafter a status indication is sent to the radio network. The radio network settings are then adjusted in response to this status indication. By means of the invention, the BSS can for example be informed that the Gs interface is down in order to make appropriate decisions and take appropriate actions.

Figure 4:
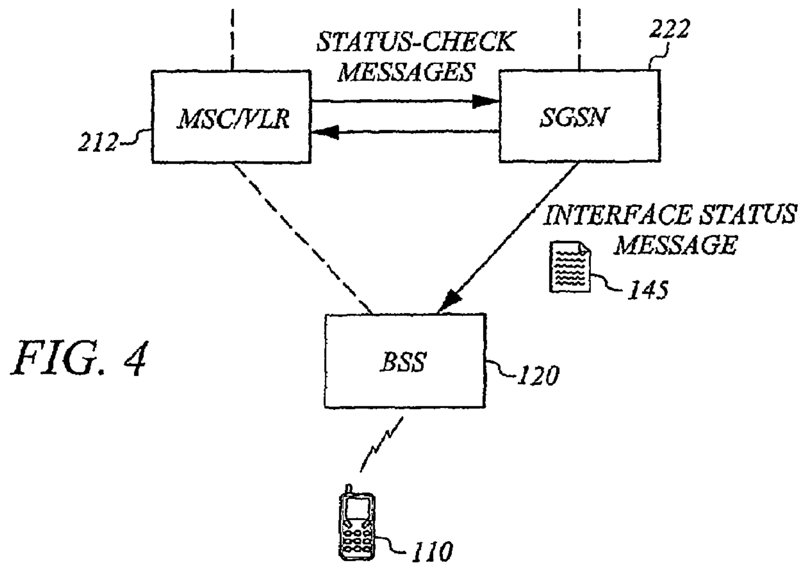
FIG. 4 illustrates interface status signaling according to a first examplary embodiment of the present invention.

FIG. 4 illustrates interface status signaling according to a first examplary embodiment of the invention. For monitoring the status of the Gs interface, a keep-alive mechanism between the MSC/VLR 212 and the SGSN 222 is proposed. The keep-alive mechanism may for example be implemented through "dummy messages", i.e. short check messages, that are sent back and forth between the MSC/VLR and the SGSN to test the core interface connection. As long as messages are received at respective node the connection works, but absence of incoming messages for a predetermined period of time could indicate a core interface error. However, should the core interface be active in the sense that predetermined frames are transferred thereover continuously, there is no need for creating dummy messages or the like. The core node (SGSN in FIG. 4) can in such a case draw conclusions about the current interface condition based on the mere frame activity.

According to the invention an indication of the measured interface status is sent to the radio network. In the embodiment of FIG. 4, an explicit Gs status message 145 is transmitted from the SGSN 222 to the BSS 120 over the Gb interface. Through this message, the SGSN can inform the BSS of Gs down periods. It is also possible to send periodical status messages, reporting not only a total interface break-down but also delays or other minor problems. If the BSS becomes aware of such problems, it can decide to take actions before the Gs interface completely stops working.

Based on the status message 145, the BSS 120 adjusts the content of the system information that is broadcast to the terminals in the radio network. Hereby, a first action may be to force the GPRS terminals 110 to stop listening to the P-channels and camp on the ordinary common control channels, typically BCCH and CCCH, instead. The service performance of the circuit switched traffic can then go back to normal since the MSC/VLR 212 can send the second CS page attempts directly to the BSS 120, which sends it out on the CCCH. Another action based on the status message proposed for BSS is to change NOM from NOM-I to e.g. NOM-II. Thereby, the mentioned try period when the terminals 110 repeatedly try to complete the combined procedures is avoided.

Today, a change of the network operating settings in BSS 120 is manually performed. A preferred embodiment of the invention instead provides functionality that alters the BSS settings in a dynamical way. Such a solution involves means for automatically updating the program code of the BSS that is related to the network settings in response to the reported Gs interface status.

Figure 5:
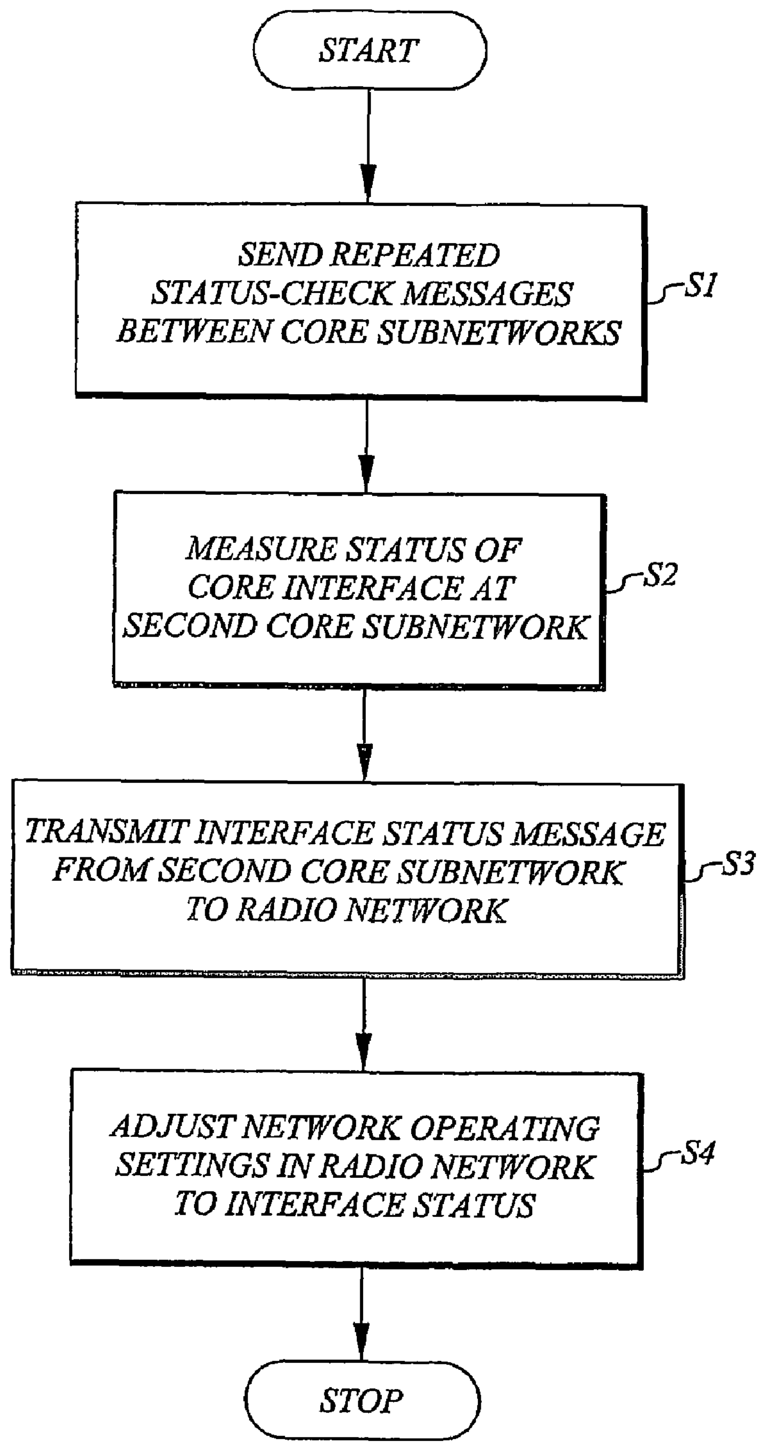
FIG. 5 is a flow chart of the first embodiment of the signaling method according to the present invention.

The described status signaling is summarized in FIG. 5, which is a flow chart of the first preferred embodiment of the signaling method according to the invention. The procedure starts with a keep-alive mechanism between the core subnetworks in a step S1, preferably achieved by continuously sending status-check messages back and forth between the subnetworks. In a step S2, the status of the core interface is detected at the second core subnetwork. This measurement gives rise to a core interface status message that is transmitted from the second core subnetwork to the radio network in a step S3. Finally, network operating settings in the radio network are adjusted to the reported condition of the core interface in a step S4.

Figure 6:
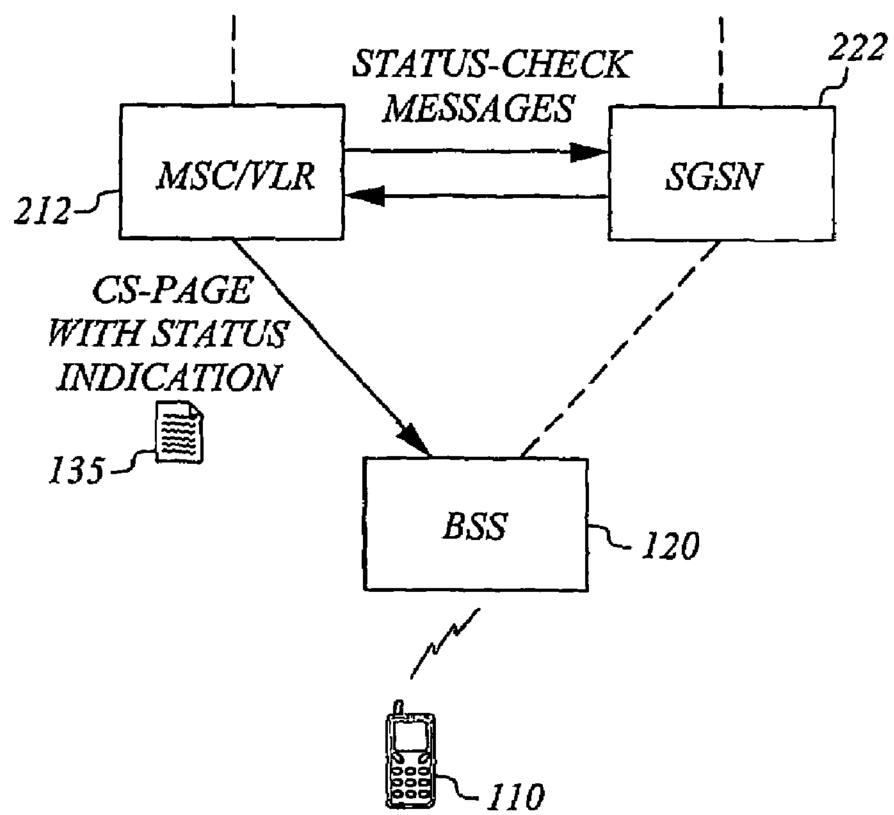
FIG. 6 illustrates interface status signaling according to a second examplary embodiment of the present invention.

FIG. 6 illustrates interface status signaling according to a second examplary embodiment of the invention. In this case, monitoring of the Gs interface is performed at the MSC/VLR 212. Preferably, a keep-alive mechanism between the MSC/VLR 212 and the SGSN 222 like the one described with reference to FIG. 4 is used. In case of paging to a mobile terminal both GPRS and IMSI attached, the MSC/VLR then determines signaling path based on this keep-alive mechanism. The Gs interface is the preferred route, but when this interface is not working properly, the MSC/VLR 212 can transmit the CS page directly to the BSS 120 over the A interface instead. Hereby, the MSC/VLR may choose to send not only second CS page attempts but already first CS page attempts over the A interface. This considerably reduces the delay caused by failed first paging attempts.

The status indication from core network to radio network is in FIG. 6 transmitted from the MSC/VLR 212 together with the CS page 135. It is preferably implemented by an explicit status message incorporated in the CS page. However, the status indication may also be accomplished by indirect means as long as the BSS 120 can interpret the meaning thereof. It would for example be sufficient to enclose an indication in the CS page 135 telling that it is intended for a terminal both GPRS and IMSI attached if the BSS is aware that the Gs-SGSN-Gb path is a possible alternative for this kind of paging event. When the BSS receives such a page directly over the A interface, this observation is enough to draw right conclusions.

Upon receipt of the status indication, the BSS 120 takes appropriate measures depending on the situation. This may include changing the network operating settings in the way described above with reference to FIG. 4.

Since the ordinary CS path over the A interface only works in absence of P-channels, deallocation of possible assigned P-channels is generally required to complete the status signaling scheme of FIG. 6. It might be the case that the BSS 120 already has deallocated the P-channels after receiving a status indication from the SGSN 222 or the MSC/VLR 212. Otherwise, a notification from the MSC/VLR makes the BSS aware that the CS page is intended for a GPRS attached mobile terminal 110, whereafter the BSS 120 in accordance with a preferred embodiment of the invention deallocates the P-channels. The deallocation is preferably accompanied by sending the CS page on both the PCCCH and the CCCH for a predetermined period of time, especially in systems where a signaling delay can be expected. This transition period should be long enough for the mobile terminal to react to the deallocation instructions. The CCCH is then used until a possible reallocation, which occurs with or without required action from the operator.

An alternative to deallocating the P-channels is to let the P-channels remain allocated and simply transmit the CS page from the BSS on the PCCCH channel. This solution also lies within the scope of the present invention. However, should a NOM-change, e.g. from NOM-I to NOM-II, for some reason be desired anyway, this is not the preferred signaling scheme.

Figure 7:
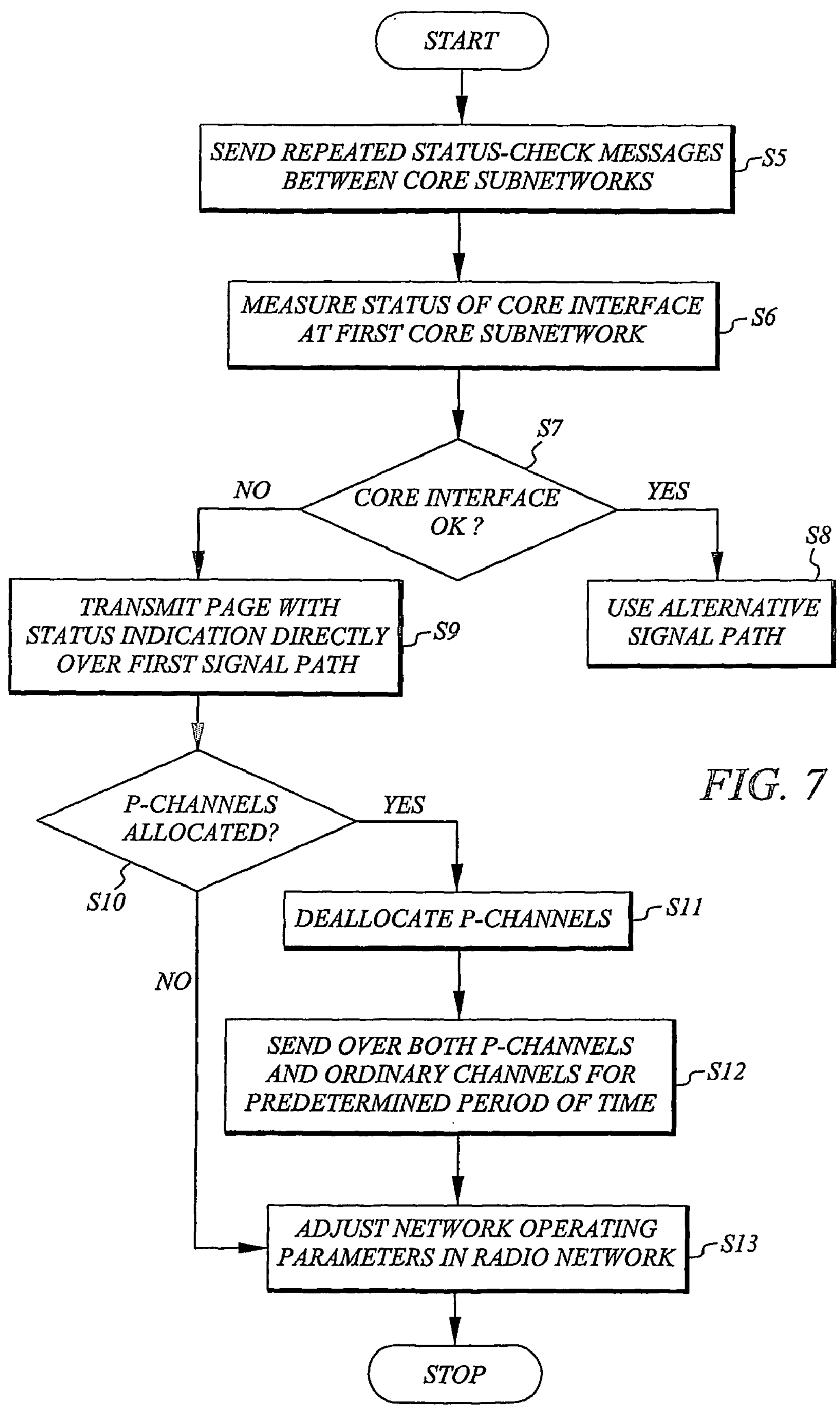
FIG. 7 is a flow chart of the second embodiment of the signaling method according to the present invention.

FIG. 7 is a flow chart of the second embodiment of the signaling method according to the invention. The method starts with a keep-alive mechanism between the core subnetworks in a step S5, preferably comprising transmitting a number of status-check messages between the subnetworks. In a step S6 the status of the core interface is detected at the first core subnetwork. Depending on whether the core interface is deemed reliable or not, an appropriate signal path is selected in a step S7. If the core interface works satisfactory, the page is sent on the alternative signal path, i.e. over the core interface and via the second core subnetwork to the radio network (step S8). Otherwise, the page is transmitted together with a status indication directly over the first signal path from the first core subnetwork to the radio network (step S9). For the subsequent transmission to the mobile terminal to work satisfactory, the P-channels are preferably not allocated and therefore it is checked whether the P-channels are allocated in a step S10. If the answer is yes, the channels are deallocated (step S11) at the radio network and since the terminal may need time to react to this information, the page is preferably sent over both the P-channels and the ordinary control channels for a certain time (step S12). If the answer is no, the page is sent directly on the ordinary control channels without the deallocation measures. In both cases, the network operating settings of the radio network may be further adjusted based on the core interface status indication in a final step S13.

By means of the present invention operators can guarantee the speech service in NOM-I irrespective of whether P-channels are allocated or not. Terminals that are both GPRS and IMSI attached will be able to receive and set up the speech calls even when the Gs interface is down in a system operated in NOM-I with P-channels. Moreover, terminals that can be both GPRS and IMSI attached can perform LA update to the MSC immediately instead of trying to complete the combined procedures. Hence, it will be possible to establish and receive CS calls at all times. These advantageous features of the invention enable a secure introduction of NOM-I and P-channels.

In the described examples, the invention is employed in GSM systems with GPRS. Even though this is the preferred implementation, it is to be understood that the invention also is applicable on Universal Mobile Telephone Systems (UMTS) as well as still other types of communication systems. The core interface monitored in accordance with the invention is thus not restricted to the MSC-SGSN connection but may interconnect two arbitrary nodes in the core network, such as e.g. two GSM MSC with different functionality.

Although the invention has been described with reference to specific illustrated embodiments, it should be emphasized that it also covers equivalents to the disclosed features, as well as modifications and variants obvious to a man skilled in the art. Thus, the scope of the invention is only limited by the enclosed claims.

The invention claimed is:

1. A signaling method for a telecommunication system comprising a radio network and a core network including a first core subnetwork connected to the radio network via a first signal path, a second core subnetwork connected to the radio network via a second signal path, the core subnetworks being reached through separate access points, and a core interface interconnecting the core subnetworks such that an alternative signal path from the first core subnetwork to the radio network via the second core subnetwork is provided, said method comprising the steps of:

measuring, in the core network, the status of the core interface:

transmitting a status indication from the core network to the radio network; and adjusting, in the radio network, network operating settings to the status of the core interface, wherein said adjusting step comprises sending information to the radio network over both a packet control channel and an ordinary control channel for a predetermined period of time.

2. The method of claim 1, wherein said measuring step is performed at the second core subnetwork and in that the status indication is a core interface status message transmitted over the second signal path.

3. The method of claim 1, wherein said measuring step is performed at the first core subnetwork, said method further comprising the step of selecting, at the first core subnetwork, a signal path for a page with radio network destination as either the first signal path or the alternative signal path, the selection being based on the status of the core interface.

4. The method of claim 3, wherein said status indication is transmitted directly over the first signal path together with the page with radio network destination.

5. The method of claim 1, wherein said measuring step involves a keep-alive mechanism between the core subnetworks.

6. The method of claim 5, wherein said keep-alive mechanism comprises the step of sending repeated status-check messages back and forth between the core subnetworks.

7. The method of claim 1, wherein said adjusting step is performed at a Base Station Subsystem (BSS) in the radio network, the BSS communicating with at least one mobile terminal.

8. The method of claim 7, wherein said adjusting step involves dynamical update of the BSS.

9. The method of claim 1, wherein said adjusting step comprises changing network operating mode based on the status of the core interface.

10. The method of claim 1, wherein said adjusting step comprises deallocating packet control channels based on the status of the core interface.

11. The method of claim 1, wherein said first core subnetwork is circuit switched and the second core subnetwork is packet switched.

12. The method of claim 1, wherein said core interface interconnects a first node belonging to the first core subnetwork and a second node belonging to the second core subnetwork, the first and the second nodes being arranged on the same general network level.

13. The method of claim 12, wherein said first node is a Mobile Switching Center (MSC) and the second node is a Serving General Packet Radio Service (GPRS) Support Node (SGSN).

14. Signaling means for a telecommunication system comprising a radio network and a core network including a first core subnetwork connected to the radio network via a first signal path, a second core subnetwork connected to the radio network via a second signal path, the core subnetworks being reached through separate access points, and a core interface interconnecting the core subnetworks such that an alternative signal path from the first core subnetwork to the radio network via the second core subnetwork is provided, said signaling means comprising:

means for measuring, in the core network, the status of the core interface;

means for transmitting a status indication from the core network to the radio network; and, means for adjusting, in the radio network, network operating settings to the status of the core interface, wherein said means for adjusting comprises means for sending information to the radio network over both a packet control channel and an ordinary control channel for a predetermined period of time.

15. The signaling means of claim 14, wherein said means for measuring belongs to the second core subnetwork and in that the status indication is a core interface status message transmitted over the second signal path.

16. The signaling means of claim 14, wherein said means for measuring belongs to the first core subnetwork, said signaling means further comprising means for selecting, at the first core subnetwork, signal path for a page with radio network destination as either the first signal path or the alternative signal path, the selection being based on the status of the core interface.

17. The signaling means of claim 16, further comprising means for transmitting the status indication directly over the first signal path together with the page with radio network destination.

18. The signaling means of claim 14, wherein said means for measuring comprises means for sending repeated status-check messages back and forth between the core subnetworks.

19. The signaling means of claim 14, wherein said means for adjusting comprises means for dynamical update of a BSS in the radio network.

20. The signaling means of claim 14, wherein said means for adjusting comprises means for changing network operating mode based on the status of the core interface.

21. The signaling means of claim 14, wherein said means for adjusting comprises means for deallocating packet control channels based on the status of the core interface.

22. The signaling means of claim 14, wherein said core interface is arranged to interconnect a first node, belonging to the first core subnetwork, and a second node, belonging to the second core subnetwork, the first and the second node being arranged on the same general network level.

23. The signaling means of claim 22, wherein said first node is a MSC and the second node is a SGSN.

* * * * *